(12) United States Patent
Knebel et al.

(10) Patent No.: US 6,687,035 B2
(45) Date of Patent: Feb. 3, 2004

(54) METHOD AND APPARATUS FOR ROI-SCAN WITH HIGH TEMPORAL RESOLUTION

(75) Inventors: Werner Knebel, Kronau (DE); Kolja Wawrowsky, Pacifica, CA (US)

(73) Assignee: Leica Microsystems Heildelberg GmbH, Mannheim (DE)

( * ) Notice: Subject to any disclaimer, the term of this patent is extended or adjusted under 35 U.S.C. 154(b) by 143 days.

(21) Appl. No.: 09/876,339

(22) Filed: Jun. 7, 2001

(65) Prior Publication Data

US 2002/0196535 A1 Dec. 26, 2002

(51) Int. Cl.$^7$ .............................................. G02B 26/08
(52) U.S. Cl. .................... 359/204; 359/214; 359/385
(58) Field of Search .................... 359/210, 204, 359/209, 305, 385, 386, 740, 317, 318; 356/318, 417; 250/234, 458.1, 461.1, 461.2; 606/9, 10, 12

(56) References Cited

U.S. PATENT DOCUMENTS

| | | | | |
|---|---|---|---|---|
| 5,035,693 A | * | 7/1991 | Kratzer et al. | 606/12 |
| 5,084,856 A | * | 1/1992 | Henmi et al. | 369/116 |
| 5,877,494 A | * | 3/1999 | Larsen et al. | 250/234 |
| 5,995,867 A | * | 11/1999 | Zavislan et al. | 600/476 |

FOREIGN PATENT DOCUMENTS

DE 19829981 1/2000

\* cited by examiner

*Primary Examiner*—Mark A. Robinson
(74) *Attorney, Agent, or Firm*—Simpson & Simpson, PLLC (57) ABSTRACT

The present invention concerns a method and an apparatus for ROI-scan with high temporal resolution of a specimen (11). At least one light source (1, 2) generates an illumination light beam (4) to be scanned by a scanning device (9) across the specimen (11). The scan pattern (23) and at least one region of interest defines a first plurality of first scan lines (21) and a second plurality of second scan lines (22). Means for adjusting illumination conditions of the at least one light source are positioned in the illumination beam path prior to the scan device (9). Control means connected to the scan device (9) and the means for adjusting the illumination conditions are responsive to the position of the light beam on the specimen.

7 Claims, 5 Drawing Sheets

METHOD AND APPARATUS FOR ROI-SCAN WITH HIGH TEMPORAL RESOLUTION

FIELD OF THE INVENTION

The present invention relates to a method and an apparatus for ROI-scan with a high temporal resolution, preferably the method is used in confocal scanning microscopy.

BACKGROUND OF THE INVENTION

In confocal scanning microscopy, a specimen is scanned with a focused light beam; this is generally achieved by tilting two mirrors arranged in the beam path of the confocal scanning microscope. The focus of the light beam is thereby moved in the focal plane, the deflection directions of the light beam most often being arranged perpendicular to one another so that, for example, one mirror deflects the beam in the X direction and another mirror deflects the beam in the Y direction. The motion or tilting of the mirrors is usually brought about with the aid of galvanometer actuating elements. Special control devices connected to the galvanometer actuating elements provide a position signal of the light beam on the specimen.

The German patent Application DE 198 29 981 discloses a method which involves coupling laser light of different spectral ranges in an, in at least two coordinates diverted microscope beam path, and directing the laser light successively on places of a test. The test is supplied in at least one plane, place for place and line for line with the laser light, and an image of the sampled plane is generated from reflected and/or emitted light. The spectral composition and/or the intensity of the laser light is changed while the scanning is continued, and at least two adjacent points of the test are supplied with light of different spectral characteristics and/or different intensity. An Independent claim is provided for a laser-scanning microscope implementing the method. The above mentioned method applies the same intensity in the scan direction and in the opposite scan direction. In other words the region of interest is illuminated with the same wavelength and/or illumination condition in the scan direction and in the opposite scan direction. A detection of the influence of the illumination condition on the region of interest is detectable only in the successive frame. For some biological processes the delay between illumination and detection is to long.

SUMMARY OF THE INVENTION

It is therefore the object of the present invention to describe a method which improves the time resolution drastically and allows an easy and specimen related change of the illumination conditions.

The above object is achieved by a method for scanning a specimen with an illumination light beam of at least one light source comprising the steps of:
  defining at least one region of interest (ROI) in a scan frame of the specimen;
  providing a first plurality of first scan lines and a second plurality of second scan lines by the intersection of the scan pattern with the at least region of interest;
  illuminating the specimen in the at least one region of in the first scan line with first illumination conditions wherein the region of the sample outside the region of interest is illuminated with second illumination conditions; and
  illuminating the specimen in the at least one region of interest in the second scan line with third illumination conditions wherein the region of the sample outside the region of interest is illuminated with fourth illumination conditions.

It is a further object of the present invention to provide an apparatus for ROI-Scan with high local resolution which improves the time resolution drastically and allows an easy and specimen related change of the illumination conditions.

The above object is accomplished by an apparatus for ROI-scan with high temporal resolution of a specimen, comprising:
  at least one light source for generating an illumination light beam to be scanned by a scanning device across the specimen in a scan pattern wherein the intersection of the scan pattern and at least one region of interest defining a first plurality of first scan lines and a second plurality of second scan lines;
  means for adjusting illumination conditions of the at least one light source wherein the means are positioned in the illumination beam path prior to the scan device, and
  control means connected to the scan device and the means for adjusting the illumination conditions in response to the position of the light beam on the specimen.

The advantage of the first embodiment of the invention is that the plurality of first scan lines is substantially superimposed to the plurality of second scan lines and the scan direction of the first scan lines and the second scan lines is unidirectional. In an other embodiment the plurality of first scan lines is substantially parallel to the plurality of second scan lines and the scan direction of the first scan lines and the second scan lines is opposite to each other.

The first illumination conditions and the third illumination conditions are the same wavelength and differ from the second illumination conditions and fourth illumination conditions both of which are the same wavelength. The illumination condition according to the above context is defined by the wavelength $\lambda$. The first and third illumination conditions are defined by a first wavelength $\lambda_1$, and the second and fourth illumination condition are defined by a second wavelength $\lambda_2$. An AOTF (acoustooptical tunable filter), EOM (electrical optical modulator) or AOM (acoustical optical modulator) is used to switch between the two wavelengths. The switching is dependent from the position of the scanning light beam within the scanned frame of a specimen.

The means for adjusting illumination conditions is an AOTF or AOM which switches the illumination condition between a plurality of intensity levels for one specific wavelength. In a further embodiment the first illumination condition is defined by a first illumination intensity level, the second illumination condition is defined by a second illumination intensity level, the third illumination condition is defined by a third illumination intensity level and the fourth illumination condition is defined by a fourth illumination intensity level.

An additional requirement for the illumination level is, that the first illumination intensity level is greater than the second illumination intensity level and the signals of the first and second illumination intensity level are displayed in a first representation on a display and the third illumination intensity level is equal to the fourth illumination intensity level and the signals of the third and fourth illumination intensity level are displayed in a second representation on the display.

An other inventive distribution of the intensity levels on the scanned specimen is that the first illumination intensity level in a first region of interest is different and greater than the second illumination intensity level and the signals of the first and second illumination intensity level are displayed in a first representation on a display and the third illumination intensity level is smaller than the fourth illumination intensity level and the signals of the third and fourth illumination intensity level are displayed in a second representation on the display.

It is especially advantageous to have the possibility to switch between at least two different laser intensities. In the scan direction 5% of the laser intensity is applied outside the region of interest and 95% of the laser intensity are applied within the region of interest. In the opposite scan direction 5% of the laser intensity are applied outside the region of interest and 0% of the laser intensity are applied within the region of interest. This allows a fast determination of an optimum parameter set for the illumination which eliminates a too high degree of bleaching. The optimum parameter set is the illumination condition which will be applied to the at least one region of interest and/or to the area of the specimen outside the region of interest. It is a further advantage that the with the inventive method and apparatus different parameter sets can be applied to different regions of the specimen.

In a combination the background of a frame may be illuminated with wavelength and illumination intensity level which are different from the wavelength and illumination intensity level within the region of interest. For example the background is illuminated with an illumination intensity level of 5% at a wavelength of 488 nm. The region of interest is illuminated with an illumination intensity level of 100% at a UV wavelength. Moreover, a plurality of regions of interest may be defined all of which may be subjected to different illumination conditions.

The inventive method and apparatus are especially suitable for fast occurring biological processes like diffusion of molecules, communication between living cells, determination of physiological parameters and the determination of membrane potentials, pH-levels, calcium levels or releasing of caged compounds.

Further advantageous embodiments of the invention are apparent from the dependent claims.

BRIEF DESCRIPTION OF THE DRAWINGS

There are various ways of advantageously embodying and developing the teaching of the present invention. Reference is made to the drawings. In the drawings.

DETAILED DESCRIPTION OF THE INVENTION

Figure 1:
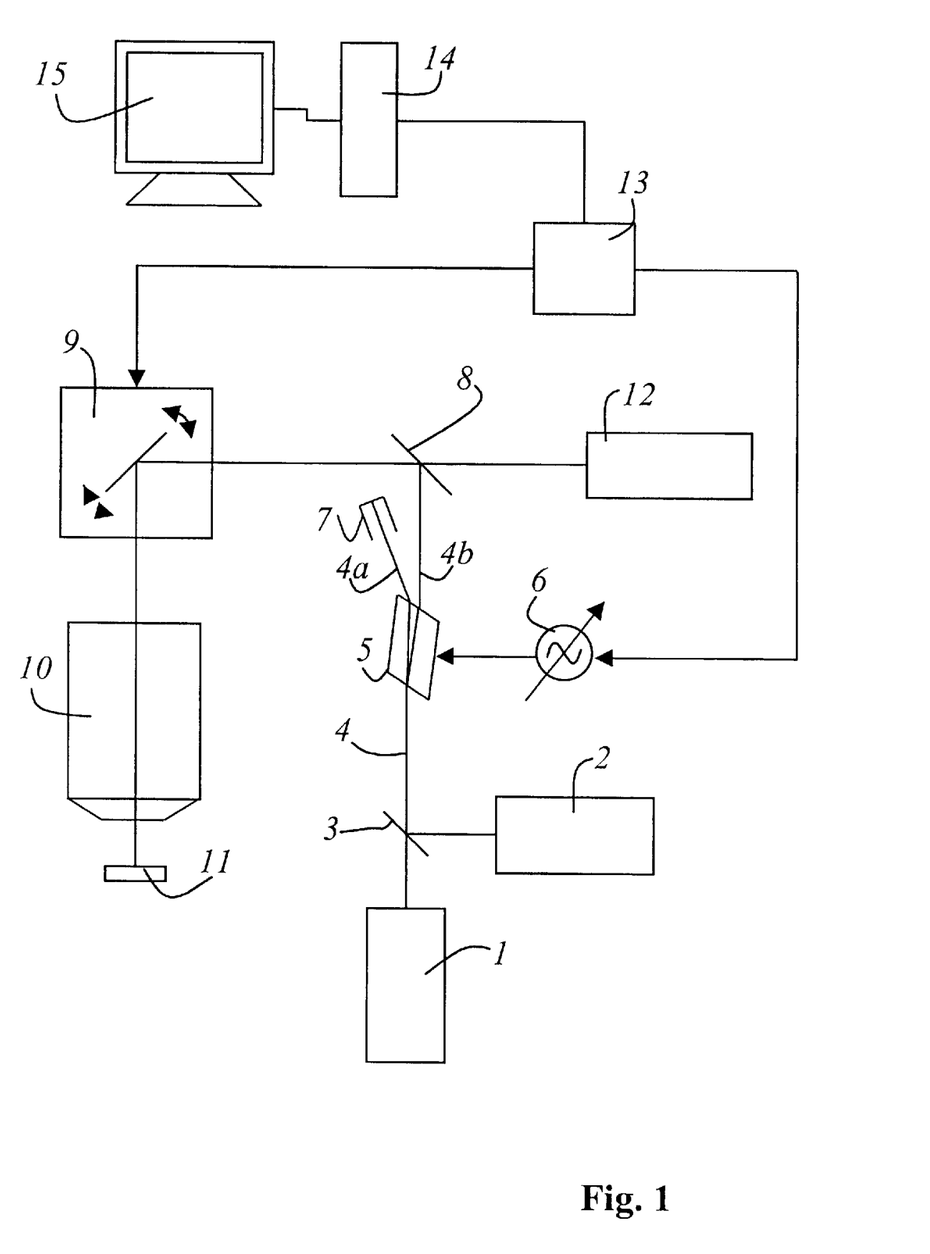
FIG. 1 schematically depicts an apparatus according to the present invention for carrying out a method according to the present invention.

FIG. 1 shows an apparatus for scanning a specimen 11 with a light beam 4. The light beam 4 may be generated by combining the light of at least a first and an second light source 1 and 2. The first and the second light source differ in wavelength and are configured as lasers. The second light source is a multi line laser. A beam combiner 3 is arranged with respect to the first and second light source 1 and 2 so that the light beam 4 is generated form the two individual light sources 1 and 2. In this embodiment, the light beam travels though an acoustooptical tunable filter (AOTF) 5. The AOTF allows the user of a confocal scanning microscope, which is the apparatus for scanning a specimen, to select various intensities per each wavelength of the light beam 4. The AOTF 5 is connected to a high frequency driving device 6 which itself is connected to a control device 13. A beam dump 7 is arranged to eliminate deflected light 4a of the light beam 4 which is not needed for further investigation of the specimen 11. Passing light 4b of the light beam 4 reaches a beam splitter 8 and is reflected from there to a scanning device 9 which leads light beam 4b through a microscope optical system or an objective 10 via the specimen 11. Fluorescent light produced in the specimen 11 passes through the objective 10 and reaches the scanning device 9. From the scanning device 9 the fluorescent light passes through the beam splitter 8 and reaches at least one detector 12. The control device 13 is connected to the scanning device 9 as well. The control device 13 is connected to a computer 14 which itself has a display 15 for displaying image signals and/or user interfaces. Furthermore, the electric signals generated by the detector 12 are delivered to the computer 14 as well. Image formation on the display 15 is accomplished in consideration of the signals from the scanning device 9, the detector 12 and the control device 13.

Figure 2:
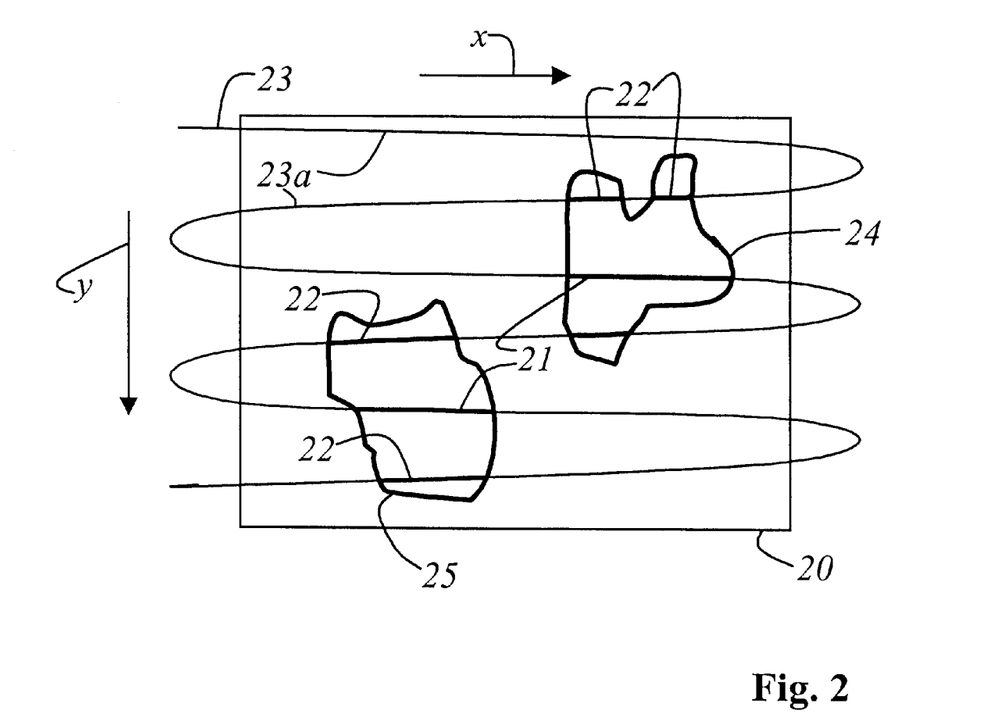
FIG. 2 is a schematic representation of a frame to be scanned wherein the frame encompasses two regions of interest.

FIG. 2 is a schematic representation of a scan frame 20 to be scanned wherein the scan frame 20 encompasses a first and second region of interest 24 and 25. The scan pattern 23 of the scan frame 20 of the specimen 11 is started in the x-direction (represented by arrow x). The scanning device 9 is configured to reverse the scan pattern 23 (opposite to the x-direction). The scan pattern 23 defines a plurality of lines 23a across the frame 20 so that every other line 23a points in the same direction. The switching from one line 23a to the next is done in y-direction (represented by arrow y) outside the scan frame 20. According to one embodiment of the invention, the scan pattern 23 intersecting the first region of interest 24 defines a first scan line 21, in the x-direction, to which light with a first wavelength $\lambda_1$ is applied and the intersection defines a second scan line 22, opposite to the x-direction, to which light with a second wavelength $\lambda_2$ is applied. The same applies to the intersection of the scan pattern 23 with the second region of interest 25. The coordination of the appliance of the various wavelengths is carried out by the control device 13. The control device 13 is connected to an AOTF (not shown) and with the information about the beam position of the according to the scanning device 9 a switching between wavelength $\lambda_1$ and wavelength $\lambda_2$ can be easily done. The switching is synchronized with the intersection of the scan pattern 23 and the user selected region of interest.

Figure 3A:
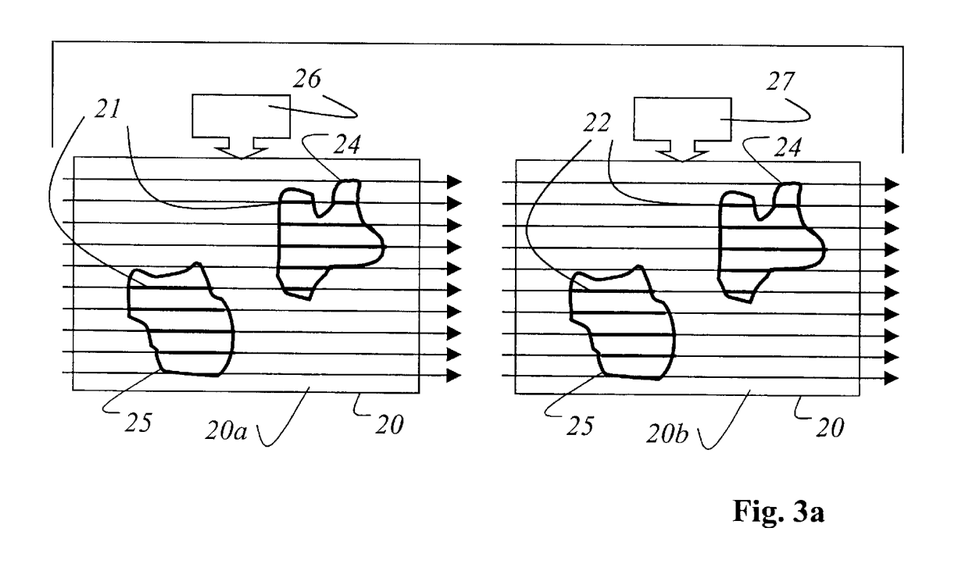
FIG. 3a is a schematic representation of a scan method applied to a scan frame wherein the first and second representation are shown simultaneously on the display.
Figure 3B:
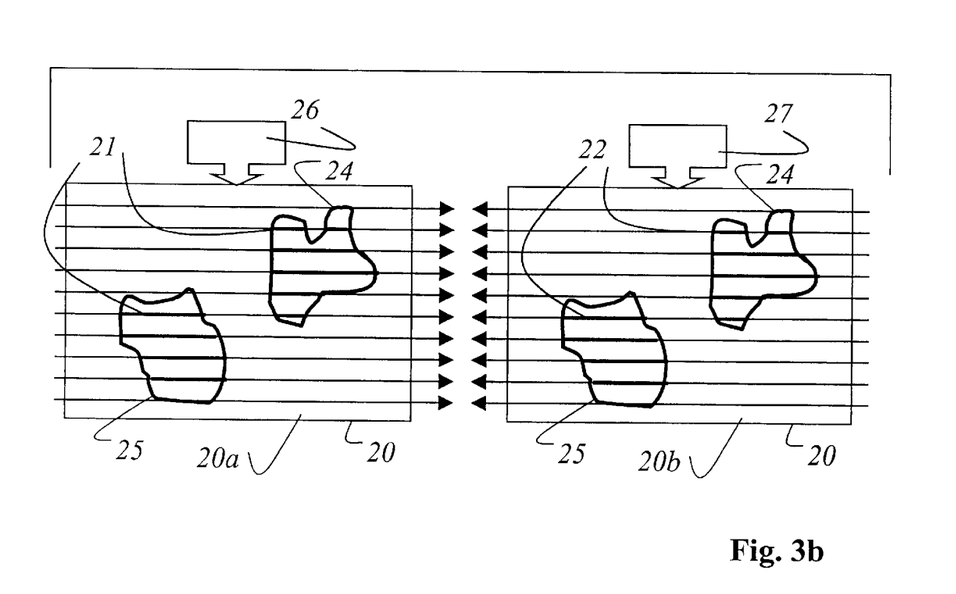
FIG. 3b is an other schematic representation of a faster scan method applied to a scan frame wherein the first and second representation are shown simultaneously on the display.

FIG. 3a shows an embodiment of the invention wherein a first representation 20a and a second representation 20b are shown simultaneously on the display 15. The first representation 20a is generated by first illumination conditions, which are constituted by a first parameter setting 26. The second representation 20a is generated by second illumination conditions which are constituted by a second parameter setting 27. The arrows across the scan frame 20 of the first representation 20a represent the substantial parallel part of the scan pattern 23 applied to the scan frame 20. The same is valid for the second embodiment as shown in FIG. 3b. The first representation 20a on the display is gained by scanning the sample line by line as shown by the arrows. The second representation 20b is obtained in that the scanning spot is move back substantially on the scan pattern 23 of the first representation 20a. In other words, the scan spot is substantially moved back along the line represented by the arrows in FIG. 3a. During the move back of the scan spot the light intensity impinging onto the specimen 11 is substantially reduced, the laser is switched to a standby mode or the laser light is blocked completely. Then the line (defined by one arrow) is scanned once again and the data gained are the second representation 20b on the display 15. The scan to gain the first representation 20a is carried out with different illumination conditions than the scan for the second representation 20b. The parameter settings comprise wavelength, intensity level or the like. In the first representation 20a the intersection of the arrows with the first and second region of interest 24 and 25 result in a plurality of first scan lines 21. In the second representation 20b the intersection of the arrows with the first and second region of interest 24 and 25 result in a plurality of second scan lines 22. The illumination conditions along the first scan line 21 are different from the illumination conditions of the second scan line 22. In a more complicated embodiment of the invention the illumination conditions of the first scan line 21 in the first region of interest 24 are different from the illumination conditions in the second region of interest 25.

FIG. 3b shows a further embodiment of the invention wherein the first representation 20a and the second representation 20b are shown on the display as well. The first representation 20a is obtained by first illumination conditions which are constituted by a first parameter setting 26. The second representation 20a is obtained by second illumination conditions which are constituted by a second parameter setting 27. The difference with respect to FIG. 3a is that the sampling of data for the first representation 20a takes place in the opposite direction as the sampling of data for the second representation 20b. The first representation 20a on the display is gained by scanning the sample line by line as shown by the arrows. The second representation 20b is obtained in that the scanning spot is moved back substantially on the scan pattern of the first representation 20a. During the move back of the scan spot data are collected at different illumination conditions impinging on the specimen 11 Then the scan spot is switched to the next line and the sampling of data for the first representation 20a starts again. The above sampling is continued until the whole frame is scanned.

Figure 4:
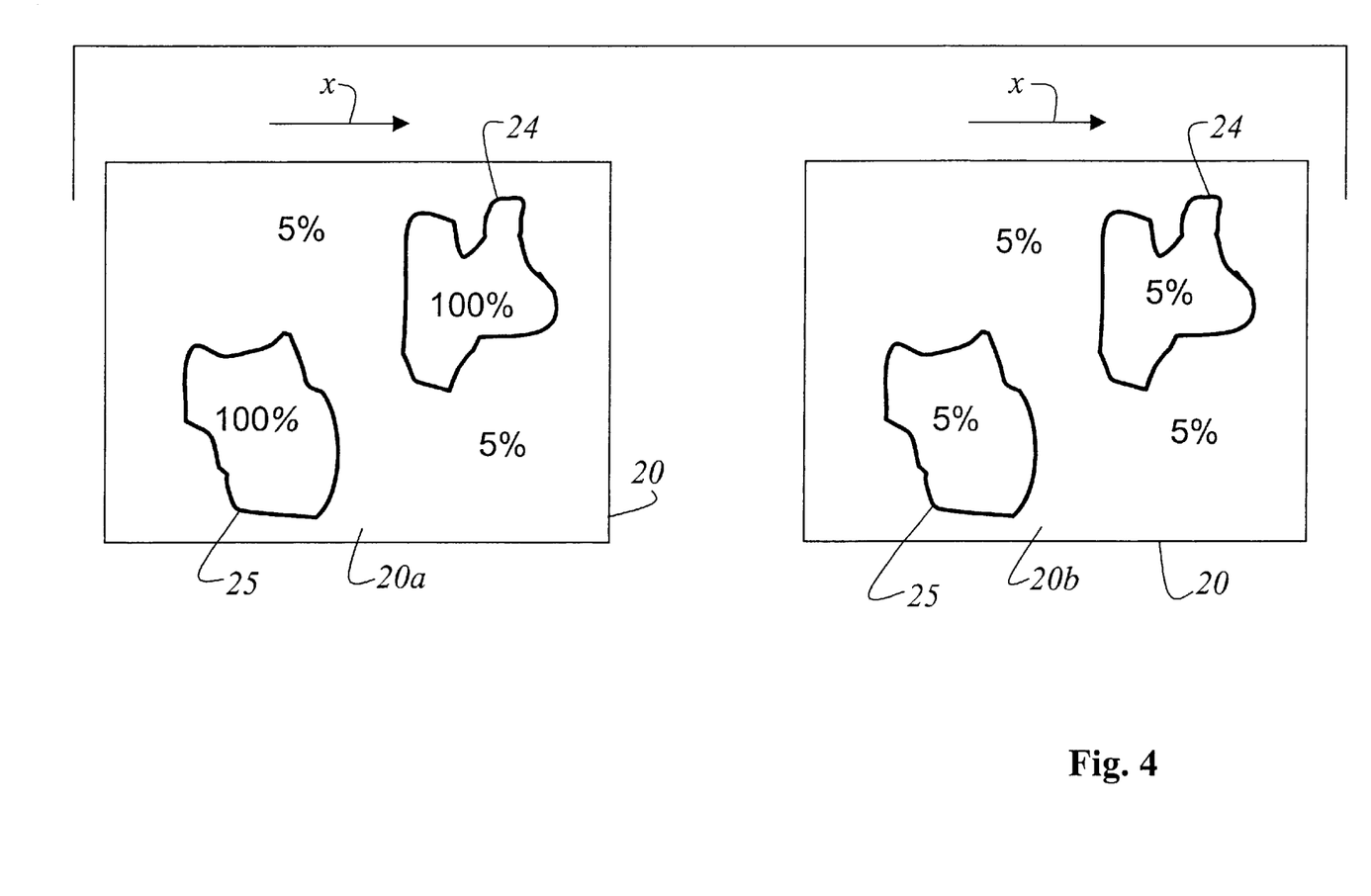
FIG. 4 is a schematic representation of a double frame display of the selected intensities applied to region of interest and the background in one direction and in the opposite direction.
Figure 5:
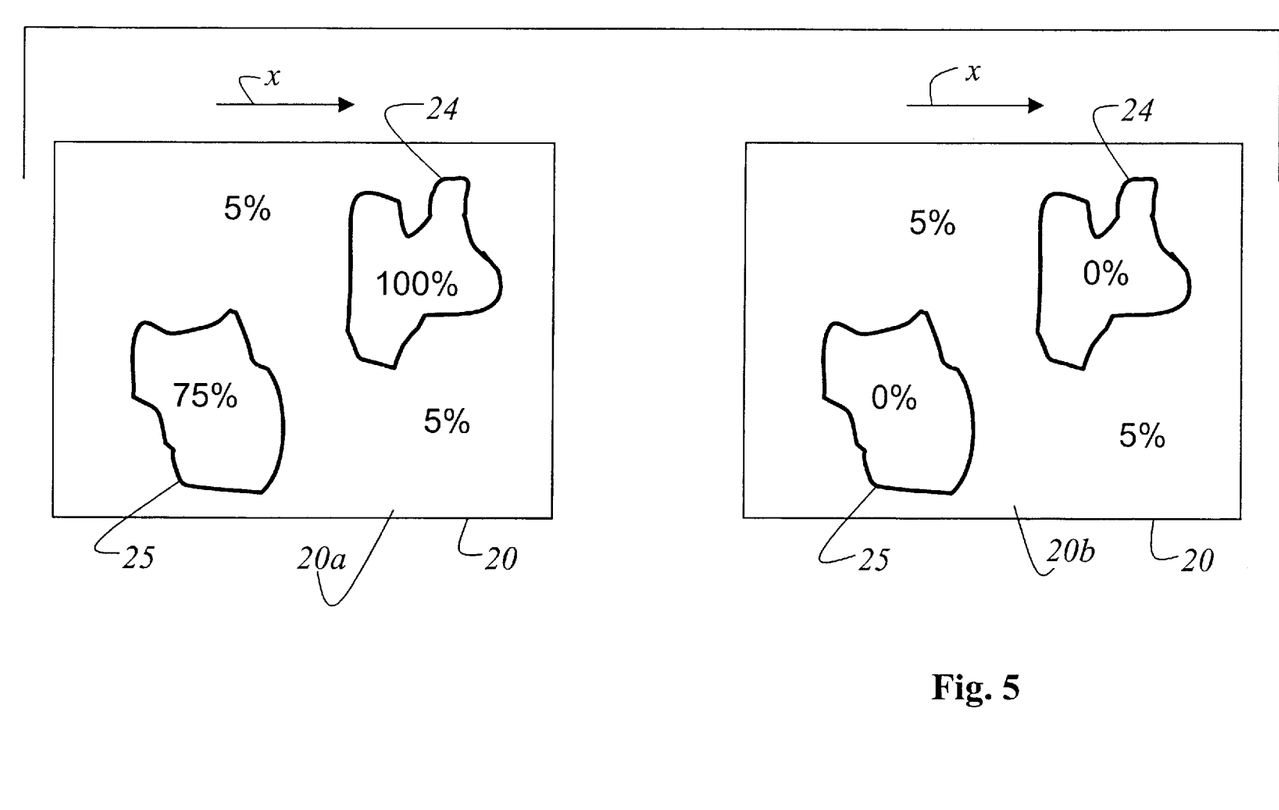
FIG. 5 is a schematic representation of an other embodiment of the double frame display of the selected intensities applied to region of interest and the background in one direction and in the opposite direction.

A further practical embodiment of the invention is shown in FIG. 4. Two representations of the scan frame 20 are displayed side by side on the display 15. The first representation 20a shows the situation that the first and second region of interest 24 and 25 are scanned with 100% of the laser intensity. The area outside the first and second region of interest 24 and 25 is scanned with a reduced laser intensity. It is understood that the percentage of the laser intensity applied to the first and second region of interest 24 and 25 as well as to the background can be selected in any suitable combination. The embodiments shown in FIG. 4 and FIG. 5 are regarded as a selection out of various possible embodiments and should not be regarded as a limitation of the invention. In the first representation the intensity of the laser is reduced to 5%. The suggested intensities are applied for the scan pattern 23 which in the direction of the arrow x. The second representation 20b shows an example for the intensities applied to the first and second region of interest 24 and 25 as well as to the background for scan lines opposite to the direction of the arrow x. The first and second region of interest 24 and 25 and the background are scanned with the intensity of 5% of the available laser intensity. With the AOTF 5 it is possible to switch the laser intensity of a wavelength to various levels. The AOTF 5 is driven according to the positional information gained from the scanning device 9. The advantage of a reduced laser intensity to applied to a sample in scan lines opposite to the direction is that no bleaching takes place. The second representation 20b is simply a read out and display of information of the processes in the specimen 11. Since the first and second region of interest 24 and 25 are subjected to 100% laser intensity, bleaching takes place in the first and second region of interest 24 and 25. The information from the scan pattern 23 in the opposite direction of arrow x is what effect the bleaching had on the first and second region of interest 24 and 25. This information is displayed in the second representation 20b.

A further practical embodiment of the invention is shown in FIG. 5. The first representation 20a shows the situation that the first region of interest 24 is scanned with 100% and the second region of interest 25 is scanned with 75% of the laser intensity. The area outside the first and second region of interest 24 and 25 is scanned with a reduced laser intensity. The laser intensity is reduced to 5%. The intensities shown in FIG. 5 are applied for the scan pattern 23 which is in the direction of the arrow x. The second representation 20b shows an example for the intensities applied to the first and second region of interest 24 and 25 as well as to the background for scan lines opposite to the direction of the arrow x. The first and second region of interest 24 and 25 are scanned with a laser intensity of 0%. The background is scanned with the intensity of 5% of the available laser intensity. With the AOTF 5 it is possible to switch the laser intensity of a wavelength to various levels. The AOTF is driven according to the positional information gained from the scanning device 9. The advantage of a reduced and/or variable laser intensity applied to different regions of interest in a sample is that the best illumination for the detection of special effects in the specimen is determined fast and easily.

The invention has been described with respect to specific embodiments. It has to be understood that skilled person can carry out variations and modifications without leaving the scope of the claims below.

| PARTS LIST | |
|---|---|
| 1 | first light source |
| 2 | second light source |
| 3 | beam combiner |
| 4 | light beam |
| 4a | deflected light |
| 4b | passing light |
| 5 | AOTF |
| 6 | high frequency driving device |
| 7 | beam dump |
| 8 | beam splitter |
| 9 | scanning device |
| 10 | objective |
| 11 | specimen |
| 12 | detector |
| 13 | control device |
| 14 | Computer |
| 15 | display |

-continued

PARTS LIST

| 20  | scan frame |
| --- | --- |
| 20a | first representation |
| 20b | second representation |
| 21  | first scan line |
| 22  | second scan rline |
| 23  | scan pattern |
| 23a | line |
| 24  | first region of interest |
| 25  | second region of interest |
| 26  | first parameter setting |
| 27  | second parameter setting |

What is claimed is:

1. A method for scanning a specimen with an illumination light beam of at least one light source, comprising the steps of:

defining at least one region of interest (ROI) in a scan frame of the specimen;

providing a first plurality of first scan lines and a second plurality of second scan lines by the intersection of the scan pattern with the at least one region of interest;

illuminating the specimen in the at least one region of interest in the first scan line with first illumination conditions wherein the region of the sample outside the region of interest is illuminated with second illumination conditions; and, illuminating the specimen in the at least one region of interest in the second scan line with third illumination conditions wherein the region of the sample outside the region of interest is illuminated with fourth illumination conditions; and, wherein the first illumination conditions and the third illumination conditions are different intensities but the same wavelength and differ from the second illumination conditions and fourth illumination conditions, both of which are the same wavelength but differ in intensity.

2. The method as defined in claim 1, characterized in that the first and third illumination condition are defined by a first wavelength λ1 and the second and fourth illumination condition are defined by a second wavelength λ2.

3. A method for scanning a specimen with an illumination light beam of at least one light source, comprising the steps of:

defining at least one region of interest (ROI) in a scan frame of the specimen;

providing a first plurality of first scan lines and a second plurality of second scan lines by the intersection of the scan pattern with the at least one region of interest;

illuminating the specimen in the at least one region of interest in the first scan line with first illumination conditions wherein the region of the sample outside the region of interest is illuminated with second illumination conditions; and illuminating the specimen in the at least one region of interest in the second scan line with third illumination conditions wherein the region of the sample outside the region of interest is illuminated with fourth illumination conditions;

wherein the first illumination condition is defined by a first illumination intensity level, the second illumination condition is defined by a second illumination intensity level, the third illumination condition is defined by a third illumination intensity level and the fourth illumination condition is defined by a fourth illumination intensity level;

wherein the first illumination intensity level is greater than the second illumination intensity level and the signals of the first and second illumination intensity level are displayed in a first representation on a display and the third illumination intensity level is equal to the fourth illumination intensity level and the signals of the third and fourth illumination intensity level are displayed in a second representation on the display; and, wherein the first illumination intensity level is 100% the intensity of the laser light source and the second, third and fourth illumination intensity level is 5% the intensity of the laser light source.

4. A method for scanning a specimen with an illumination light beam of at least one light source, comprising the steps of:

defining at least one region of interest (ROI) in a scan frame of the specimen;

providing a first plurality of first scan lines and a second plurality of second scan lines by the intersection of the scan pattern with the at least one region of interest;

illuminating the specimen in the at least one region of interest in the first scan line with first illumination conditions wherein the region of the sample outside the region of interest is illuminated with second illumination conditions; and, illuminating the specimen in the at least one region of interest in the second scan line with third illumination conditions wherein the region of the sample outside the region of interest is illuminated with fourth illumination conditions;

wherein the first illumination condition is defined by a first illumination intensity level, the second illumination condition is defined by a second illumination intensity level, the third illumination condition is defined by a third illumination intensity level and the fourth illumination condition is defined by a fourth illumination intensity level; and, wherein the first illumination intensity level in the first region of interest and the second region of interest are different and greater than the second illumination intensity level, and the signals of the first and second illumination intensity levels are displayed in a first representation on a display and the third illumination intensity level is smaller than the fourth illumination intensity level and the signals of the third and fourth illumination intensity level are displayed in a second representation on the display.

5. The method as defined in claim 4, characterized in that the first illumination intensity level in the first region of interest is 100% of the intensity of the laser light source and the first illumination intensity level in the second region of interest is 75% of the intensity of the laser light source, the third intensity level in the first and second region of interest is 0% of the intensity level of the laser light source and the fourth illumination intensity level is 5% the intensity of the laser light source.

6. An apparatus for region of interest (ROI)-scan with high temporal resolution of a specimen, comprising:

at least one light source for generating an illumination light beam to be scanned by a scanning device across the specimen in a scan pattern wherein the intersection of the scan pattern and at least one region of interest defining a first plurality of first scan lines and a second plurality of second scan lines;

means for adjusting illumination conditions of the at least one light source wherein the means are positioned in the illumination beam path prior to the scan device; and, control means connected to the scan device and the means for adjusting the illumination conditions in response to the position of the light beam on the specimen;

wherein the means for adjusting the illumination conditions apply in at least one region of interest in the first scan line a first illumination condition wherein the region of the sample outside the region of interest is illuminated with a second illumination condition and apply in the at least one region of interest of the second scan line a third illumination condition wherein the region of the sample outside the region of interest is illuminated with a fourth illumination condition;

wherein the first illumination condition is defined by a first illumination intensity level, the second illumination condition is defined by a second illumination intensity level, the third illumination condition is defined by a third illumination intensity level and the fourth illumination condition is defined by a fourth illumination intensity level; and, wherein the first illumination intensity level in a first region of interest and in a second region of interest are different and greater than the second illumination intensity level and the signals of the first and second illumination intensity levels are displayed in a first representation on a display, and the third illumination intensity level is smaller than the fourth illumination intensity level and the signals of the third and fourth illumination intensity level are displayed in a second representation on the display.

7. An apparatus for scanning a specimen with an illumination light beam of at least one light source, the apparatus comprising:

means for defining at least one region of interest (ROI) in a scan frame of the specimen;

means for providing a first plurality of first scan lines and a second plurality of second scan lines by the intersection of the scan pattern with the at least one ROI;

means for illuminating the specimen in the at least one region of interest in the first scan line with first illumination conditions wherein the region of the sample outside the region of interest is illuminated with second illumination conditions; and, means for illuminating the specimen in the at least one region of interest in the second scan line with third illumination conditions wherein the region of the sample outside the region of interest is illuminated with fourth illumination conditions; and, wherein the first illumination conditions and the third illumination conditions are different intensities but the same wavelength and differ from the second illumination conditions and fourth illumination conditions, both of which are the same wavelength but differ in intensity.

* * * * *

UNITED STATES PATENT AND TRADEMARK OFFICE
CERTIFICATE OF CORRECTION

PATENT NO. : 6,687,035 B2
DATED : February 3, 2004
INVENTOR(S) : Knebel et al.

It is certified that error appears in the above-identified patent and that said Letters Patent is hereby corrected as shown below:

<u>Title page,</u>
Item [73], Assignee, should read -- Leica Microsystems Heidelberg GmbH --.

Signed and Sealed this

Fifteenth Day of November, 2005

JON W. DUDAS
*Director of the United States Patent and Trademark Office*